(No Model.)
T. W. EMERY.
BELTING.
No. 420,779. Patented Feb. 4, 1890.
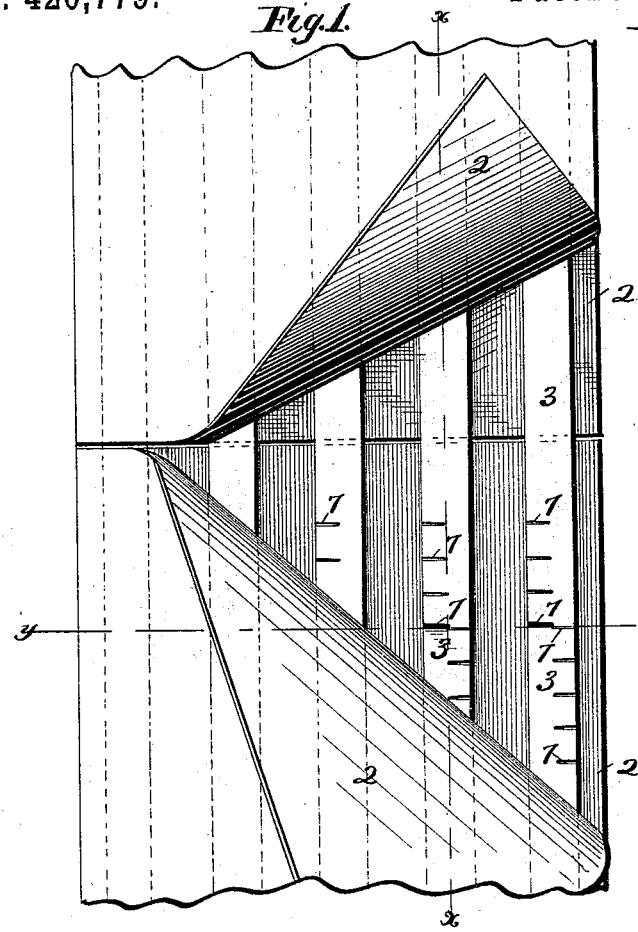
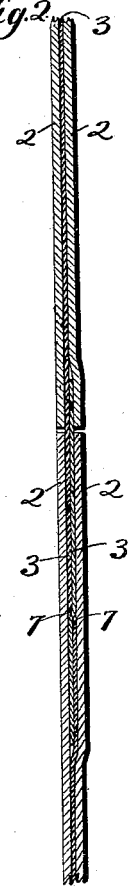
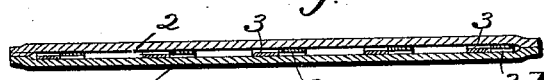
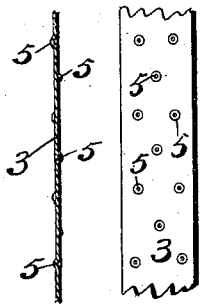
Witnesses.
J. Jessen
B. Booth
Inventor.
Thomas W. Emery
By Paul _____ atty

UNITED STATES PATENT OFFICE.

THOMAS WM. EMERY, OF MINNEAPOLIS, MINNESOTA.

BELTING.

SPECIFICATION forming part of Letters Patent No. 420,779, dated February 4, 1890.

Application filed June 15, 1889. Serial No. 314,426. (No model.)

*To all whom it may concern:*

Be it known that I, THOMAS WILLIAM EMERY, of Minneapolis, in the county of Hennepin and State of Minnesota, have invented certain new and useful Improvements in Inelastic Belting, of which the following is a specification.

My invention relates to belts used in the driving of machinery, whether composed of leather, rubber, cloth, or other flexible material; and its object is to so construct said belts that while preserving their flexibility they are rendered absolutely non-elastic, and the ends of the belt may be joined without riveting or tying in the ordinary manner; and it consists, generally, in the construction and combination hereinafter described, and particularly pointed out in the claims.

In the accompanying drawings, forming a part of this specification, Figure 1 is an elevation of a portion of my improved belting, showing the construction and manner of uniting the ends. Fig. 2 is a longitudinal section of the same on line $x$ $x$ of Fig. 1; Fig. 3, a cross-section of same on line $y$ $y$ of Fig. 1. Figs. 4 and 5 are details showing strips provided with projections. Figs. 6 and 7 show modified form of lock.

In the drawings, 2 represents the two layers of an ordinary leather belt; 3 3, the metallic strips arranged parallel with each other and longitudinal of the belt and cemented between the layers 2 2. These strips are preferably of steel, which is superior from its flexibility and because it cannot be stretched any appreciable amount by severe longitudinal strain. These strips may be formed as smooth flat ribbons or indented so as to form slight projections 5 5 on the opposite side, which become embedded in the material surrounding them and hold the strips firmly in place, so as to prevent slipping between the layers of the belting or lateral movement so as to wear the belting material. When woven into cloth belting, the strips serve to form in part the warp of the belting, and the belting can afterward be dressed with oil or other waterproofing composition, which renders it impervious to water, and also assists in holding the strips firmly in position.

In uniting the ends of the belt the ends of the layers are preferably turned back and the opposite ends of the strips overlapped a sufficient distance, and then locked together so as to form a strong union when the loose ends of the layers of the belts are cemented together, thus firmly inclosing between them the united ends of the strips. By this means there are no projecting rivets or thongs and the belt has a smooth union, while being absolutely inelastic for all practical purposes, and light belts may be constructed of vastly greater tensile strength than if made without the metallic strips and suitable to be used in positions exposed to the weather where ordinary belting cannot be used, since the metallic strips are unaffected by moisture.

Belts may be formed with any desired number of metallic strips, the edges of the belt being preferably cemented together outside of the strips, so that they are firmly inclosed and held in place.

In uniting two belts together edge to edge the union is much improved and strengthened by inclosing a metallic strip between the joined edges, the strip extending into the body of each belt, and the belt-layers being cemented or riveted to the metallic strip.

I prefer the form of lock shown in the drawings, in which the strips are provided with series of vertical notches or slots 7 7, extending one-half of the width of the strip, the slots at opposite ends being on opposite sides or alternately on both sides, whereby the strips can be doubly locked so as to engage each other. By this means the strips can readily be locked and again unlocked if it is necessary to take up any slight stretch of the belt or "crawl" of the belt-layers. The metallic strips being flat do not strain or injure the fabric of woven belting, as is the case when wire is used, and being plane-surfaced, or free from transverse corrugations they cannot be stretched, whereas if they had curves or transverse corrugations the belt would yield or stretch lengthwise in proportion to the corrugations employed. This stretching is what I seek to avoid, while at the same time preserving the flexibility of the belt and imparting strength thereto.

I claim—

1. The belting composed of the metallic ribbons having their adjacent ends slitted, lapped, and locked together, and the covering for the ribbons made to lie on opposite sides of the lapped ends of the ribbons, so as to inclose the same, substantially as and for the purposes set forth.

2. The belting composed of the metallic ribbons having transverse slits in the edges, with the ends of the strips joined together by lapping and having one edge inserted in the slits of the adjacent edge, and a covering, substantially as described, for said ribbons, substantially as and for the purposes set forth.

In testimony whereof I have hereunto set my hand this 10th day of June, 1889.

THOMAS WM. EMERY.

In presence of—
T. D. MERWIN,
A. C. PAUL.